April 28, 1925.
L. A. COLELLA ET AL
1,535,200
NONSKID GRIPPING MEMBER
Filed March 5, 1924
2 Sheets-Sheet 1
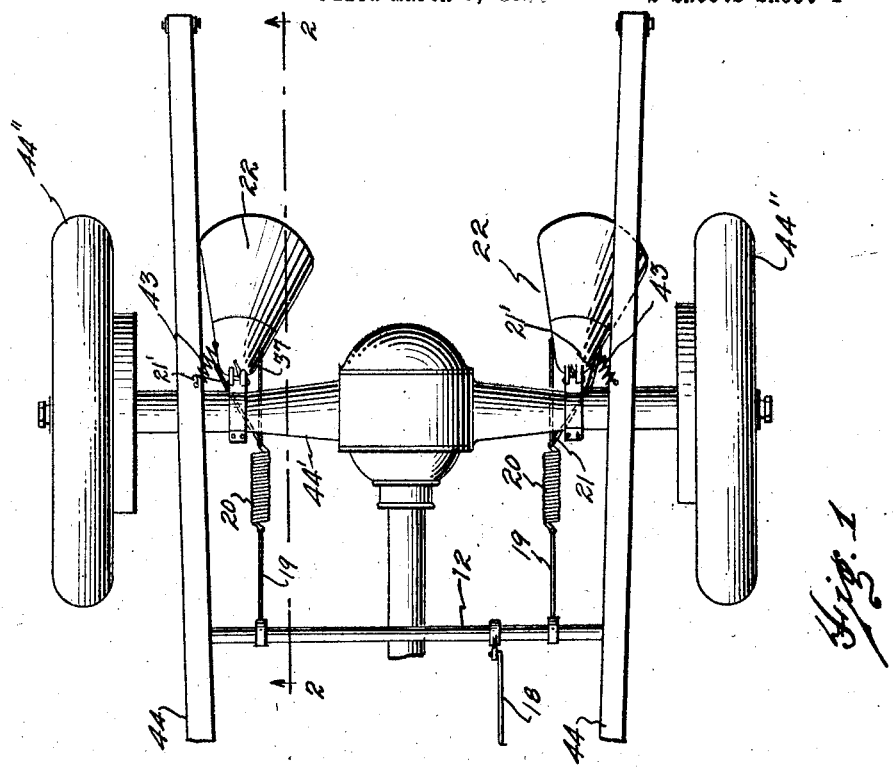
Fig. 1
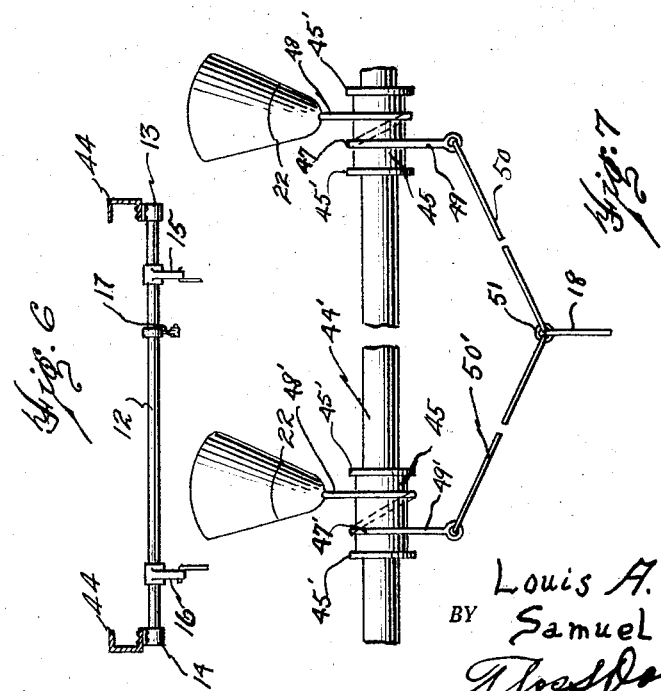
INVENTOR.
Louis A. Colella
BY Samuel Zeff
ATTORNEY.

April 28, 1925. 1,535,200
L. A. COLELLA ET AL
NONSKID GRIPPING MEMBER
Filed March 5, 1924 2 Sheets-Sheet 2
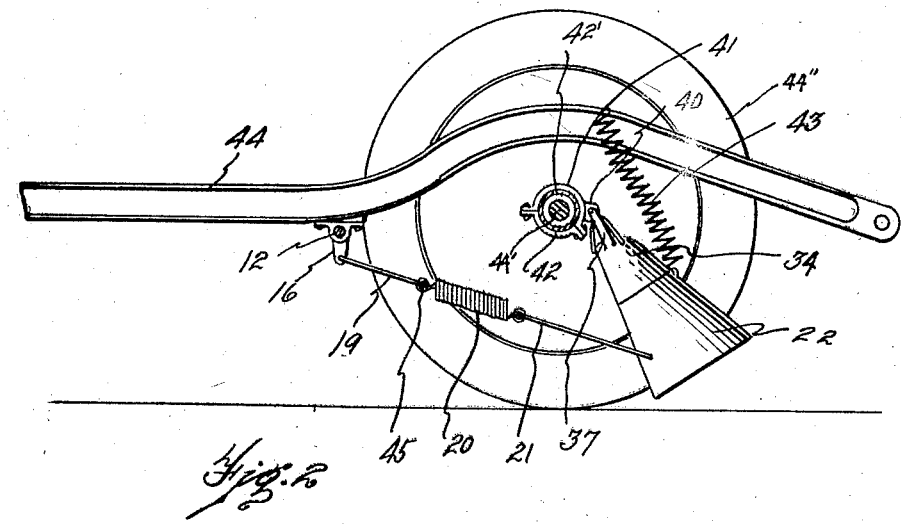
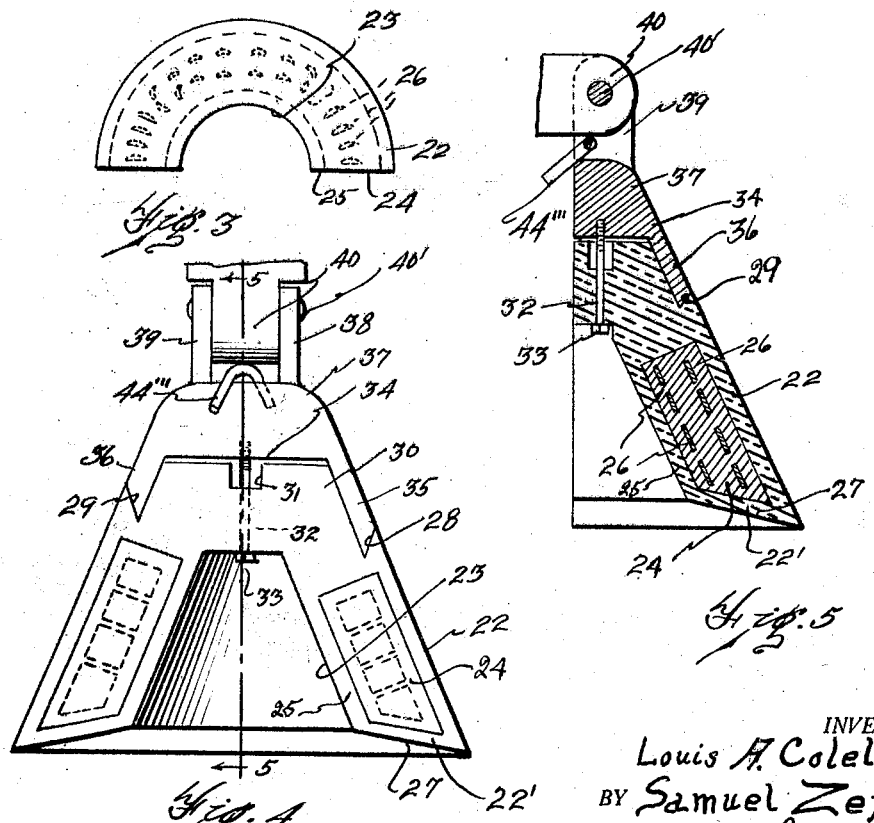
INVENTOR
Louis A. Colella.
BY Samuel Zeff
ATTORNEY.

Patented Apr. 28, 1925.

1,535,200

UNITED STATES PATENT OFFICE.

LOUIS A. COLELLA AND SAMUEL ZEFF, OF DETROIT, MICHIGAN.

NONSKID GRIPPING MEMBER.

Application filed March 5, 1924. Serial No. 696,968.

*To all whom it may concern:*

Be it known that I, LOUIS A. COLELLA, former subject of the King of Italy, who have declared my intention of becoming a citizen of the United States, and SAMUEL ZEFF, a citizen of the United States, residing at Detroit, in the county of Wayne and State of Michigan, have invented a new and useful Improvement in a Nonskid Gripping Member, of which the following is a specification.

Our invention relates to a new and useful improvement in a non-skid gripping member adapted for use with vehicles, and particularly automobiles, for preventing the skidding or side swinging of the vehicle. The invention, also, on account of its structure and operation, serves to assist the ordinary braking mechanism of the vehicle for retarding the velocity of the vehicle. An object of the invention is the provision of a device of this class which will be simple in structure, economical of manufacture and highly efficient in use.

Another object of the invention is the provision in a device of this class of yieldable means adapted for engaging the surface over which the vehicle is being propelled and for forming a suction connection with the surface to prevent the lateral movement of the vehicle and also assist in retarding the forward movement of the same.

Another object of the invention is the provision in a device of this class of ground gripping means formed from rubber and steel and adapted for movement into and out of operative position at the will of the operator of the vehicle.

Another object of the invention is the provision in a device of this class of means for retaining gripping member in elevated position and of providing the gripping member with resisting means tending normally to maintain the gripping member in its various positions of adjustment.

Another object of the invention is the provision in a device of this class for mounting a pair of gripping members of the class described on the vehicle and so connecting the same that they may be operated simultaneously to either operative or inoperative position.

Another object of the invention is the provision in a device of this class of a gripping member having a yieldable contact member supported by a carrying member, and so arranged that the same may be removed and replaced at will with a minimum operation.

Another object of the invention is the provision in a device of this class of a contact member having an outer layer of rubber enclosing an inner portion of fabric, or rubber treated with fabric, and having imbedded therein steel reinforcing members for strengthening the device and lending durability to it.

Other objects will appear hereinafter.

The invention consists in the combinations and arrangements of parts hereinafter described and claimed.

The invention will be best understood from a reference to the accompanying drawings which form a part of this specification and in which, Fig. 1 is a top plan view showing the invention applied to a vehicle, Fig. 2 is a view taken on substantially line 2—2 of Fig. 1 showing a portion of the invention in elevation, Fig. 3 is a bottom plan view of one of the gripping members used in the invention, Fig. 4 is an elevational view of one of the gripping members used in the invention, Fig. 5 is a sectional view taken on substantially line 5—5 of Fig. 4, Fig. 6 is an elevational view of the operating bar used in the invention, and Fig. 7 is a fragmentary plan view of a modified form of operating the gripping members used in the invention.

The invention, in its preferred form, comprises an operating bar 12, which is rotatably mounted on the chassis 44 of the vehicle, having an axle 44' carrying wheels 44". The operating bar 12 is rotatably mounted in clips 13 and 14 at its opposite ends, said clips 13 and 14 being secured to the chassis 44 of the vehicle with which used. Fixedly mounted on the bar 12 is a rocking arm 15, adjacent one end thereof, and a similar rocking arm 16 adjacent the opposite end thereof, these rocking arms being adapted for extending downwardly therefrom.

Extending downwardly from the bar 12 is a rocking arm 17, which is attached to a suitable cable, or rod, 18 operable by the ordinary brake foot pedal of the vehicle, or by a separate lever if desired, positioned accessible to the operator of the vehicle. The gripping members are substantially semi-bell-shaped having an outer coating of rubber 22 on the outer surface, and inner coating of rubber 25 on the inner surface, the interior thereof being open to provide a semi-conical space 23. Interposed between the layers 22 and 25 is a liner of rubber treated fabric 24 in which is imbedded throughout a series, or plurality, of steel reinforcing members 26, which are comparatively short and spaced apart, positioned in series of aligning rows to render the gripping member more rigid, and to add to its durability and prevent wear of the same, as will be readily understood. The lower edge 27 of the gripping member is beveled outwardly toward the base thereof, so as to permit the outer edge of the gripping member to strike the surface with which it is adapted to contact previous to the contact of the inner edge thereof therewith. A layer of rubber 22' extends along the contacting surface so as to shield the steel members from the surface with which contact is made. As shown in Figs. 1 and 2, the open portion of the contact members is directed slightly toward the right side of the vehicle, so that the vehicle in skidding toward the right will bring the open face of the contact members into engagement with the surface, thus permitting a maximum amount of engagement with the surface when the car is skidding, in this way rendering the device particularly efficient in preventing a skidding of the vehicle. Owing to the structure and formation of the contact member a slight vacuum is created when the device is brought into contact with the surface over which the vehicle is being propelled. This vacuum results from a pressing of the device downwardly and serves to assist the members in gripping the surface to perform the functions intended. As shown in Fig. 4, the contact members are provided with a cut-away portion having beveled edges 28 and 29. The termination of this cut-away portion being closer to the contact edge at 28 than at the opposite side 29, thus causing this shoulder which is formed to extend diagonally transversely of the contact member. This provides a sort of tongue 30 having an opening 31 positioned therein for facilitating the passage of a bolt 32 through an opening formed in the upper portion of the contact member. A suitable nut 33 is threaded upon the bolt, said bolt being fixedly mounted in a steel carrying cap 34, which is provided with an overhanging flange 35 having a beveled edge adapted to engage the edge 28 and the opposite side of this carrying cap having a shorter flange 36 adapted to engage the beveled edge 29. Projecting upwardly over the cap, centrally thereof is a flange 37 at opposite sides of which are formed lugs 38 and 39, spaced apart, and adapted to receive between them a knuckle 40, which is held in position between the lugs by a suitable bolt, or pintle, 40' projected through the lug and the knuckle 40. As shown in Fig. 2 this knuckle 40 projects from a hanger 41 associated with a co-operating hanger portion 32 which are securely bound upon the axle housing 42' in a clamping relation. Positioned between the knuckle 40 and the upper portion of the flange 37 is a spring 44''' adapted to normally tend to separate the flange 37 from the knuckle 40, so that the movement of the contact member on the bolt 40', as a pivot, is normally resisted. In this way, when the contact member is moved on the bolt 40', as a pivot, the spring 44''' tends to retain the contact member in the position to which moved. A suitable cord 19 is provided for attaching the rocker arm 15 to a spiral spring 20. Projecting from the spiral spring 20 and connected to one side of the contact member is a cord 21, and connected to the opposite side of the contact member is a cord 21'. A similar connection is made from the rocker arm 16 so that upon a rocking of the operating bar 12, the contact members will be brought to move downwardly on their pivot so as to engage the surface over which the vehicle is passing. A release of the pressure on the operating bar 12 will permit the springs 43 to restore the contact members to normal position; that is, to elevated position so as to be free from engagement with the surface over which the vehicle is passing.

In Fig. 7 we have shown a modified form of operating the contact members. In this modified form, a suitable sleeve 45 may be positioned on the axle housing 44' at opposite sides thereof, said sleeve 45 being provided, at opposite ends, with guide flanges 45'. Rockingly mounted on the sleeve 45, between the guide flanges 45', is a curled portion 47 of a metal strip, having the rearwardly projecting end 48 connected to the contact member with which operating. The forwardly projecting end 49 is connected to a suitable cord 50 which, in turn, connects to a ring 51. This ring is attached to a cord or rod 18 and is operated as previously described. On the opposite side of the axle, a similar curled portion 47' is mounted, having a rearwardly extending portion 48' attached to the contact member, and a forwardly extending portion 49' connected to the ring 51 by a cord 50'. In operation, a drawing of the cord, or rod 18, forwardly of the vehicle through the operation of a suitable lever, will cause a rocking of the member 47 on the sleeve 45 so as to press the contact members downwardly into engagement with the surface over which the vehicle is being propelled. The operation is substantially the same as in the preferred form, already described, except that the contact members are pushed downwardly, instead of being pulled, as in the form shown in the other figures.

In operation, the device may be operated simultaneously with the brakes of the vehicle, or may be operated separately therefrom, the particular mountings of the operating levers, which are designed to draw the rod or cord 18 forwardly, are not shown, as these operating devices are well known in the art.

While we have illustrated and described the preferred form of structure, we do not wish to limit ourselves to the precise form of structure shown, but desire to avail ourselves of such variations and modifications as come within the scope of the appended claims.

Having thus described our invention, what we claim as new and desire to secure by Letters Patent is:

1. An anti-skidding device adapted for use with a vehicle and comprising semi-bell shaped contact members formed from yieldable material; steel reinforcing members mounted in said yieldable material; a rocking cap attached to the upper portion of said yieldable material; means for mounting said cap swingingly on the axle of a vehicle; means for swinging said contact members into engagement with the surface over which the vehicle is being propelled; and means for normally maintaining said contact members free from engagement with said surface.

2. In a non-skid device adapted for use with vehicles, a substantially semi-bell shaped contact member formed from yieldable material; metallic reinforcing members imbedded in said material and extending longitudinally of the sides thereof; a metallic carrying cap; means for mounting said contact member on said cap; means for mounting said cap swingingly on said vehicle to permit the engagement of said contact members with the surface over which said vehicle is propelled; means for bringing said contact members into engagement with said surface at the will of the operator; and means for normally maintaining said contact members free from engagement with said surface.

3. In an anti-skidding device of the class described a contact member formed from yieldable material, substantially semi-bell shaped and having the outer edges thereof beveled inwardly thereof; the periphery of said contact member being provided with a diagonally extending shoulder to form a reduced portion, adjacent the upper end thereof; a cap having a flange adapted to engage said shoulder on said yieldable member; means for mounting said yieldable member on said cap; means for mounting said cap on the axle of the vehicle swingable relatively thereto to permit the engagement of said contact members with the surface over which the vehicle is being propelled; means for swinging said contact members relatively to said axle for bringing said contact members into engagement with said surface over which said vehicle is being propelled; and resilient means for normally maintaining said contact members free from engagement with said surface.

4. In an anti-skidding device of the class described, a contact member comprising a substantially semi-bell shaped yieldable engaging member; sectional metallic reinforcing members imbedded therein and a metallic cap adapted for embracing the upper portion of said yieldable member; and means for detaching said yieldable member from said cap.

5. An anti-skidding device comprising a pair of contact members; means for mounting said contact members on the axle of a vehicle with which used, swingable relatively thereto for engagement with the surface over which said vehicle is being propelled; resilient means for normally maintaining said contact members free from engagement with said surface; an operating bar extending transversely of said vehicle and rotatably mounted thereon; an operating arm projecting downwardly from said bar; means connected with said operating arm for rocking said bar at the will of the operator; and resilient bearing means connected with said bar and said contact members for bringing said contact members into engagement with said surface, upon the rocking of said operating bar.

In testimony whereof we have signed the foregoing specification.

LOUIS A. COLELLA.
SAMUEL ZEFF.